Oct. 27, 1931.    J. L. DRAKE    1,828,832
SHEET GLASS APPARATUS
Filed Oct. 27, 1926

Inventor
John L. Drake.
By Frank Fraser
Attorney

Patented Oct. 27, 1931

1,828,832

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed October 27, 1926. Serial No. 144,429.

This invention relates to sheet glass apparatus and has more particular reference to the drawing of a continuous sheet.

In certain forms of sheet glass drawing apparatus, for example, that disclosed in Colburn Patent No. 1,248,809, granted Dec. 4, 1917, the sheet of glass, after being drawn vertically from the molten source is bent into the horizontal plane about a rotatable bending roll and passed over an idler roll onto the flat upper surface of a horizontally travelling flattening and drawing table or conveyor. This flattening table comprises an endless flexible belt consisting of a series of pivotally connected metallic links, the belt passing about a pair of supporting drums at the two ends of the loop, and the upper sheet carrying run of the belt being slidably supported on the flat upper surface of a stationary table mounted between the two drums. The plastic glass sheet is carried by the flat upper surface of this link belt and settles thereupon, becoming flat while being carried by and along with the conveyor belt. The friction of the sheet resting upon the travelling table serves to provide a tractive pull for drawing the glass sheet from its molten source.

When the glass sheet passes from the idler roll onto the flattening or draw table it is still in a plastic condition and susceptible to surface marks or irregularities. As the endless belt passes around the drums into its upper horizontal run, the metallic links thereof have a tendency to buckle-up or project into the upper flat horizontal plane occupied by the plastic glass sheet and the lifting or buckling of the links at the two ends of their upper horizontal run causes impressions or defects in the glass sheet which are known as table marks or bumps.

Moreover, the glass sheet has a tendency to sag between the idler roll and flattening table which renders it even more apt to be marred by the links as it passes onto the table just about the point where the buckling up of the links occurs. It is the aim of the present invention to provide improved means for supporting the sheet in such a manner that the usual idler roll now commonly employed may be eliminated and whereby the sheet will be caused to pass onto the flattening table later and therefore further away from the buckling-up point of the links thereof, thereby permitting the production of a smoother sheet and one which is relatively free from table marks or bumps.

Another important object of the present invention is to provide in sheet glass apparatus, improved means for supporting a horizontally arranged sheet.

Another important object of the invention is to provide in sheet glass apparatus, a blanket of air forming an air cushion for supporting a horizontally arranged sheet.

Another object of the invention is to provide in sheet glass apparatus, means for directing a current of air onto a horizontally arranged sheet whereby to support the same and prevent sagging thereof.

A further object of the invention is to provide in sheet glass apparatus, means for drawing a sheet from a mass of molten glass, means for deflecting said sheet from a vertical into a horizontal plane, and means for directing a blanket of air onto said sheet, whereby to support the same in its horizontal plane.

A still further object of the invention is to provide in sheet glass apparatus, means for drawing a sheet from a vertical into a horizontal plane, and means for forming an air cushion for supporting said sheet in its horizontal plane and preferably before it engages the said drawing means.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through improved sheet glass drawing apparatus constructed in accordance with the present invention.

Figure 1:
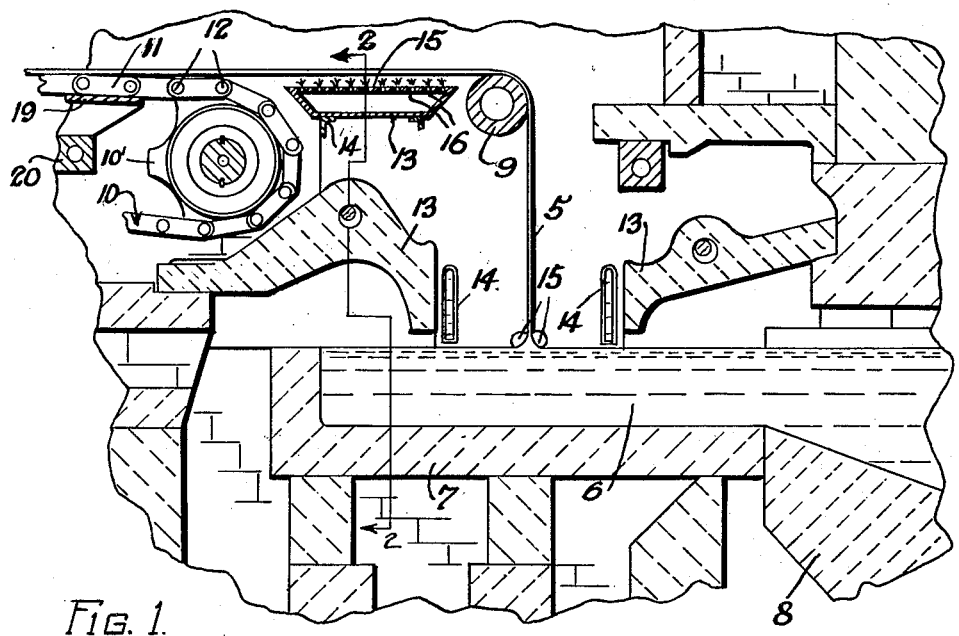

In the Colburn process above referred to, a sheet 5 is continuously drawn from a mass of molten glass 6 contained in a so-called draw pot 7, the draw pot being continuously replenished with molten glass from a tank furnace 8. The sheet 5 is drawn preferably in a vertical plane initially and subsequently deflected horizontally and drawn over a bending roll 9, and endless flexible conveyor belt or flattening table 10 trained at the opposite ends of its loop about suitable sprockets or drums 10′.

The flattening table 10 comprises a series of metallic links 11 arranged in an overlapping and intermeshing relation with their ends pivoted on continuous cross shafts 12 which extend completely across the width of the belt. The sheet of glass rests upon the upper flat horizontal surface of the links as shown in Fig. 1. The upper horizontal run or flight of the draw table 10 rests upon a guideway 19 supported upon a plurality of cross-bars 20 (only one being shown) with the opposite ends of the said guideway 19 inclining slightly downwardly as more fully disclosed in the Colburn patent referred to above.

Arranged above the pot 7 are cover or lip-tiles 13 which tend to force any heat currents at that point downwardly toward the surface of the molten glass 6. Coolers 14 are disposed relatively close to the surface of the molten glass from which the sheet is drawn and absorb sufficient heat to permit the drawing of a good sheet of glass. Edge treating means in the form of knurled rollers 15 are also provided adjacent the source of molten glass 6 to maintain the sheet to width.

In flattening tables of the character above described, there is a tendency for the links thereof to buckle up at the two ends of their upper horizontal run and project into the upper flat horizontal plane occupied by the glass sheet. The lifting or buckling of the links causes impressions or defects in the glass sheet as it passes onto the flattening table. The sheet also, because of its plastic condition, normally sags between the bending roll and the flattening table so that it is even more apt to be marred by the metallic links 11 as it passes onto the table close to the buckling-up point of these links.

Figure 2:
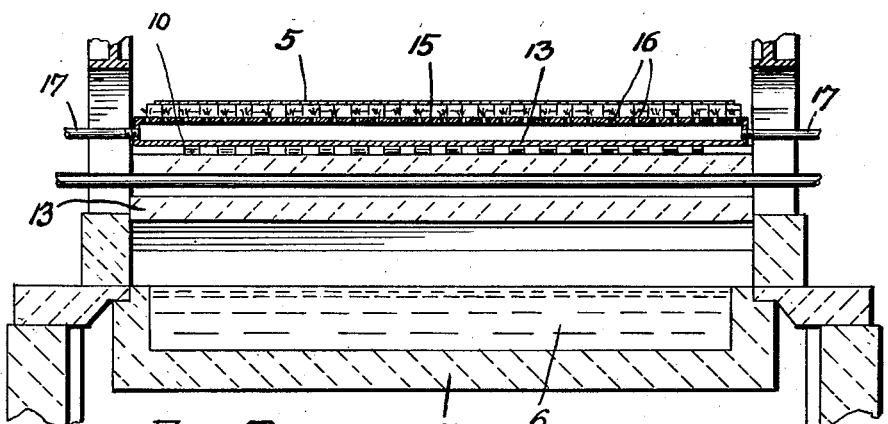
Fig. 2 is a section taken on line 2—2 of Fig. 1.

In accordance with the present invention, the usual idler roll commonly employed in certain processes such as in the Colburn process above referred to is eliminated and in lieu thereof there is provided a member 13 in the form of a hollow casing. This member is positioned between the bending roll 9 and flattening table 10 and is supported upon suitable beams or brackets 14. The member 13 extends the entire width of the sheet 5 as shown in Fig. 2 and is provided with a substantially wide flat upper surface 15 formed with a plurality of openings 16.

In the operation of the present invention, a supply of air is forced into the member 13 through suitable supply pipes 17 entering the opposite ends thereof. This air which then issues from the member 13 through the openings 16 therein, is directed upwardly against the bottom surface of the sheet 5 and forms an air cushion for supporting the sheet between the bending roll 9 and flattening table 10.

This air cushion prevents the sheet from sagging in its horizontal plane between the bending roll 9 and flattening table 10 and thus causes it to pass onto the flattening table later and therefore further away from the point where the buckling-up action of the links 11 occurs. With such an arrangement, it is possible to produce a smoother sheet and one which is relatively free from table marks or bumps. The air used for supporting the sheet may be sufficiently heated, if desired, so that it will have no cooling effect on the sheet. However, it will be appreciated that either cool or heated air may be used as preferred without departing from the spirit of the invention.

Figures 3, 4:
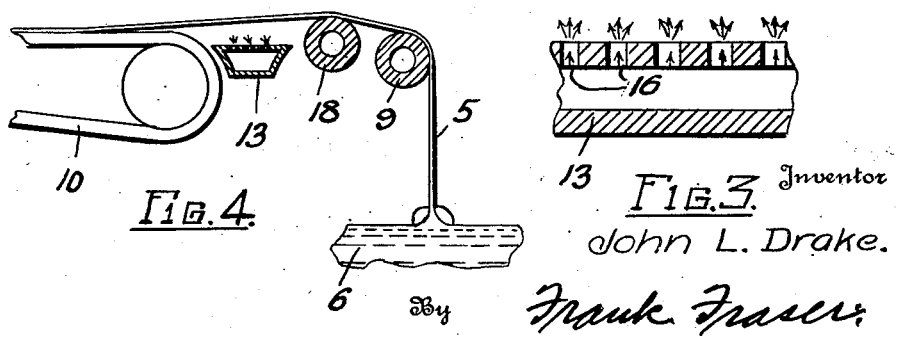
Fig. 3 is a longitudinal section through a portion of the air supplying member.
Fig. 4 is a section showing a slightly modified form of the present invention.

In Fig. 4 wherein has been disclosed a somewhat modified form of the present invention, it will be noted that there is also provided an idler roll 18 to assist in supporting the glass sheet 5 between the bending roll 9 and flattening table 10. The bending roll 9 is in substantially the same horizontal plane with the flattening table 10 while the idler roll 18 is slightly elevated above the plane of the bending roll 9 and flattening table 10. The hollow member 13 is somewhat smaller than as shown in Fig. 1 and is positioned between the idler roll 18 and flattening table 10. The air issuing from the member 13 will form a blanket or air cushion for supporting the sheet between the idler roll 9 and flattening table 10 whereby to prevent sagging thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In combination a sheet glass apparatus, a horizontally traveling endless conveyor for drawing a sheet vertically from a mass of molten glass, means for deflecting the sheet from the vertical into the horizontal plane, and a member in the form of a hollow casing positioned beneath the sheet between the conveyor and deflecting means and extending the entire width thereof, the top of said casing being flat and provided with a series of perforations extending in spaced rows both longitudinally and transversely thereof, and means for introducing air into the opposite ends of said casing from which the air passes through said perforations in a manner to create an air cushion beneath the sheet to support and prevent sagging thereof.

2. In combination in sheet glass apparatus, a horizontal traveling endless conveyor of link construction for drawing a sheet vertically from a mass of molten glass, sprocket means about which the conveyor is trained at the opposite ends of its loop, a bending member for deflecting the sheet from the vertical into the horizontal plane, the upper horizontal sheet supporting run of the endless conveyor and bending member being on substantially the same horizontal level with the end of said run adjacent the said bending member inclining slightly downwardly, and means positioned beneath the sheet between the conveyor and bending member and adjacent the former for creating an air cushion beneath the sheet to support the same and to cause it to contact initially with said conveyor inwardly of the buckling-up point of the links as the said links pass about the sprocket means into the horizontal plane.

3. In combination in sheet glass apparatus, a horizontal traveling endless conveyor of link construction for drawing a sheet vertically from a mass of molten glass, rotatable means about which the conveyor is trained at the opposite ends of its loop, a bending member for deflecting the sheet from the vertical into the horizontal plane, the upper horizontal sheet supporting run of the conveyor and bending member being on substantially the same horizontal level with the end of said conveyor run adjacent the said bending member inclining slightly downwardly, and means positioned beneath the sheet between the conveyor and bending member and adjacent the former for creating an air cushion beneath the sheet to support the same and to cause it to contact initially with the conveyor inwardly of said rotatable means.

4. In combination in sheet glass apparatus, a horizontal traveling endless conveyor of link construction, for drawing a sheet vertically from a mass of molten glass, sprocket means about which the conveyor is trained at the opposite ends of its loop, a bending member for deflecting the sheet from the vertical into the horizontal plane, said bending member being positioned slightly above the level of the adjacent end of the upper horizontal sheet supporting run of said conveyor and means positioned beneath the sheet between the conveyor and bending member and adjacent the former for creating an air cushion beneath the sheet to support the same and to cause it to contact initially with said conveyor inwardly of the buckling-up point of the links as the said links pass about the sprocket means into the horizontal plane.

Signed at Toledo, in the county of Lucas and State of Ohio, this 25th day of October, 1926.

JOHN L. DRAKE.